Figure 1:
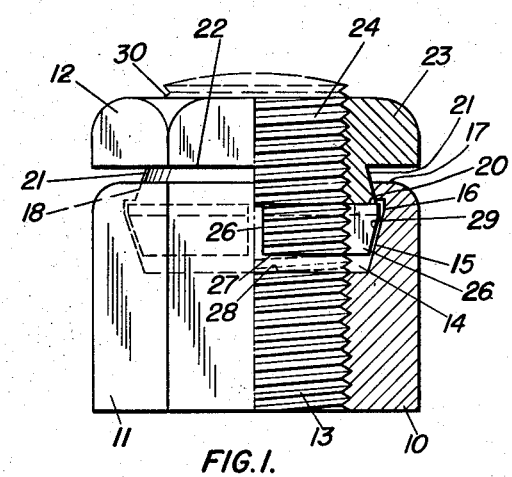

Aug. 15, 1950     H. R. HARDING     2,518,469
LOCK NUT
Filed Jan. 23, 1948

INVENTOR.
HIRAM R. HARDING.
BY Howard J. Whelan.
ATTORNEY.

Patented Aug. 15, 1950

2,518,469

UNITED STATES PATENT OFFICE 2,518,469

LOCK NUT

Hiram R. Harding, Baltimore, Md., assignor of fifty per cent to Harry E. Karr, Baltimore County, Md., and twenty-five per cent to Logan C. Harding, Hopewell, Va.

Application January 23, 1948, Serial No. 3,841

2 Claims. (Cl. 151—19)

This invention relates to fastening devices and more particularly to those of the nut and bolt type in which the latter can be locked in place.

The conventional manner of locking the nut on a bolt requires the positioning of the bolt in a piece of equipment against which another piece is laid and held by the nut on the bolt. Since the nut is subject to loosening from various conditions, such as vibration, heat and cold or physical effects, thereby making the fastening less stable, various devices are employed to overcome the conditions, that cause such loosening. In many instances this is accomplished by the use of spring washers, additional nuts or the use of clips etc. bent over to engage the sides of the nut in a permanent connection to the bolt. The main objections to these arrangements are, that they require additional loose parts that are subject to loss, or need the use of some special tool and extra mechanical effort to bend the clip or provide the necessary attachment. When these arrangements are modified to remove their restraining effects, they likewise need special care to avoid the loss of the extra parts or require special tools to unloosen them. It is therefore an object of this invention to avoid these objections and provide a new and improved locking arrangement that will avoid one or more of the disadvantages and limitations of the prior art.

Another object of this invention is to provide a new and improved locknut that will provide a positive and stable locking arrangement for a nut and bolt fastening, that will be applicable by the use of a conventional wrench or tool, and will do so effectively without the use of parts independently separable from the nut used for the purpose.

An additional object of the present invention is to provide a new and improved nut-lock unit that will be securely connected with the nut.

A further object of the invention is to provide a new and improved nut-lock arrangement that will be incorporated as a definite part of the nut used in the conventional manner for a bolt, and so inherently connected therewith as to be alignable with the screw threads on the bolt on which it is used for the normal bolting of the nut thereon and then lockable thereon by further tightening in a very simple manner, with the same wrench used in the bolting.

A further object of the invention is to provide a new and improved lock-nut, in which the lock portion is frictionally held in the body portion so the threads in each portion will be aligned with each other so the nut may be placed on a bolt and locked thereon.

Other objects will become apparent as the invention is more fully set forth.

In order to illustrate the invention and explain its principles, reference is made to the appended drawings, which indicate a particular form of the invention by way of example, in conjunction with the following description, while the scope of the invention is particularly pointed out in the claims.

Figure 2:
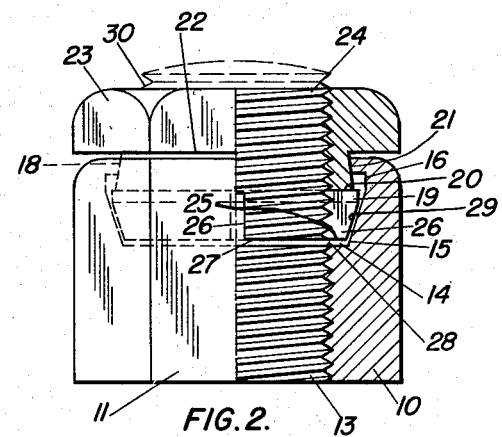

In the drawings:

Figure 1 is a side elevation of a lock nut before locking on a bolt embodying this invention, a portion being in section to show the interior construction; and Figure 2 is a similar view of the lock nut shown in Figure 1, a portion likewise being in section to indicate its internal positioning when the lock is tightened on bolt.

Similar reference numerals refer to similar parts throughout the drawings.

In the invention herein disclosed, a nut-lock unit for a bolt consists of two parts, one linked within the other. They are both internally threaded to fit on a bolt, and are termed the nut element and the lock element respectively. They are both rigidly attached to one another when being screwed on to a bolt. This is accomplished by jamming one into the other so that at a definite positioning of the elements, their threads will so align with one another, that they will screw on to the bolt threads readily. After the nut unit is mounted on the bolt and tightened against the material it is to hold, the lock element is screwed down so that it turns independently of the nut element, causing it to bind on the threads of the bolt and be locked thereon. The binding is augmented by having a tapered surface of the lock element riding on a tapered surface of the nut element as it is screwed down into the locking position, and thereby tightening by wedging as well as by a tendency to cross-thread.

In the particular form shown in the drawings, a nut body 10 has an external hexagon contour of a conventional nut with its bottom surface 11 flat and its top surface 12 chamfered at its edges. It has an internally threaded passage 13 to provide a central threading from the bottom 11 to a distance of about two-thirds towards the top. The passage is enlarged above the threaded portion to provide a conical chamber 14 having smooth wall surfaces 15. For a short distance a part of its surface 16 is cylindrical and is overcast by an internally projecting flange 17 about the throat 18 at the top which is larger than the diameter of the passage 13. A lock element is interlocked in the body element by having its conical shank walls 29 loose within the chamber 14 and prevented from leaving it by reason of the greater diameter of the peripheral surface 19 and ledge 20 formed thereby, than that of the throat 18 of the flange 17. A neck 21 tapers from the ledge 20 to the underside 22 of the hexagon head 23 of the lock element. The head 23 is of the same wrench enclosing size and contour as that of the body element 10 below it. The shank 25 has four slots 26 spaced 90° from each other, cut through its wall from the bottom surface 27 of the shank to a location at the ledge 20 of the head 23. This is to provide a certain amount of resiliency or flexibility to the shank when it is peripherally stressed in a radial direction. The nut element is tightened to a rigid placement when it is wedged up with its tapered neck 21 tight in the throat 18 of the flange 17. This neck 21 is tapered inversely to the shank at about 7½° as is also the wall of the throat 18. In this position the central screw threaded passage 24 in the lock element is threadably aligned with the threading 13 of the body element, so that a bolt 30 on which both are placed will screw freely on both. When the elements are screwed down on the bolt in a position of tightness, the body element is detached from the wrench or tool used, but the tool is left to engage the head 23 of the lock element. The head is turned to tighten up on the bolt 30 and leaves its wedged position induced by the neck 21 in the flange 17. Further turning runs the lock element down on the bolt and brings its bottom surface 27 closer to the top 28 of the threaded passage 13. It will be noticed that there is enough space at the lower section of the chamber 14 to enable this to be done and allow for sufficient adjustment required for the purpose. The conical or tapering side walls 15 and 29 of the body and lock elements are wedged together during this action and permitted by the slots 26 to bind readily on the bolt 30 while this is being done. This wedging, due to the fact that the threads of the lock element are being forced in a cross-thread movement on the bolt 30, causes the shank to become lock tight. Any tendency of the nut body 10 to unloosen will meet with the opposition afforded by this tight engagement of the lock element on the bolt 30, and the tendency of the walls 15 of the nut element to wedge more tightly on the walls 29 of the lock element as the former unloosens. In other words any attempt of the nut body to unloosen tends to tighten it against the locking member.

The device is effective for the purpose described. It may be worked quickly and does so without damaging any parts of the unit. The tightening is done with the same tool or wrench used for general tightening of the unit. The parts are readily aligned so the placing of the unit on a bolt will not be troubled by misalignment during the normal placing of the elements thereon. After the body is tightened the lock is then turned separately to suit. The parts are attached to one another so there is no tendency to lose one or the other. The unit makes a neat looking fastening for a bolt, and it is of a form that affords low production costs. A particular feature of these constructions are that in normal position the elements are disposed in a position that definitely indicates that the threads of both are so aligned that they can be screwed on to the bolt in that position without cross threading.

This is preferably accomplished by jamming the tapered neck 21 up into the throat 18 so the hexagonal faces of the lock and body are aligned and frictionally held from turning. The body and lock are then tapped together in one operation. For assembly of the lock and body the shank of the lock is forced through the throat of the body until its enlarged portion is pushed under the ledge of the body and resiliently expands to lock under it; the slots in the shank assist in this process. When unlocking and removing the nut from the bolt the wrench is positioned on the lock portion and is moved counterclockwise to its starting position so its walls will align with those of the body portion, the wrench is then placed on both the lock and body members and they are removed from the bolt. During the unlocking of the lock member it follows the lead of the screw threads in an upward direction until the neck 21 is tightly positioned in the throat 18 in the flange 17 as originally mentioned. This frictional contact also prevents the lock member from being turned clockwise beyond the starting point and binding on the threads of the bolt 30 in a reverse manner.

While but one general form of the invention is shown in the drawings and described in the specifications it is not desired to limit this application for patent to this particular form or in any other way otherwise than limited by the scope thereof, as it is appreciated that other forms could be made that would use the same principles and come within the scope of the appended claims.

Having thus described the invention, what is claimed is:

1. A lock-nut comprising in combination, a body element having a screw threaded passage therethrough, said threaded passage extending upwardly from the bottom of the body into a chamber having walls tapered upwardly and outwardly to join a vertical circumferential wall which terminates in a ledge having a tapered throat therein, a lock element having a screw threaded passage therethrough and a head portion for turning same, said lock element being provided with a neck tapered to suit the taper in said throat and to be locked therein against turning and back locking when the lock element is forced upward through a counterclockwise movement on a screw thread to which it is attached, said neck terminating in a peripheral surface for positioning in said vertical circumferential wall and be restrained therein by said ledge, said lock element being provided with lower side walls tapered to suit the taper in said chamber walls and be forced inwardly through the downward movement of said lock element.

2. A lock-nut comprising in combination a body element having a screw threaded passage therethrough, said threaded passage extending upwardly from the bottom of the body into a chamber having walls tapered upwardly and outwardly to join a vertical circumferential wall which terminates in a ledge having a tapered throat therein, a lock element having a screw threaded passage therethrough and a head portion for turning same, said lock element being provided with a neck tapered to suit the taper in said throat and to be locked therein against turning and back locking when the lock element is forced upward through a counterclockwise movement on a screw thread to which it is attached, said neck terminating in a peripheral surface for positioning in said vertical circumferential wall and be restrained therein by said ledge, said lock element being provided with lower side walls tapered to suit the taper in said chamber walls and be forced inwardly through the downward movement of said lock element, said lower side walls being slotted to provide adjustment therein.

HIRAM R. HARDING.

REFERENCES CITED

The following references are of record in the file of this patent:

UNITED STATES PATENTS

| Number | Name | Date |
|---|---|---|
| 996,133 | Peters | June 27, 1911 |
| 1,199,031 | Smith | Sept. 19, 1916 |
| 1,606,941 | Holman | Nov. 16, 1926 |

FOREIGN PATENTS

| Number | Country | Date |
|---|---|---|
| 116,862 | Great Britain | June 27, 1918 |
| 697,855 | France | Nov. 5, 1930 |
| 765,730 | France | Mar. 31, 1934 |